May 5, 1925.  1,536,879
T. CARTER
RUBBER SANDAL ASSEMBLING MACHINE
Filed Aug. 29, 1924  8 Sheets-Sheet 1

Fig. 1.

Thomas Carter
INVENTOR
BY Victor J. Evans
ATTORNEY

WITNESS:

May 5, 1925.

T. CARTER

RUBBER SANDAL ASSEMBLING MACHINE

Filed Aug. 29, 1924

Thomas Carter INVENTOR

BY Victor J. Evans ATTORNEY

WITNESS:

Fig. 3.

May 5, 1925. 1,536,879
T. CARTER
RUBBER SANDAL ASSEMBLING MACHINE
Filed Aug. 29, 1924 8 Sheets-Sheet 5

Thomas Carter
INVENTOR
BY Victor J. Evans
ATTORNEY
WITNESS:

May 5, 1925.

T. CARTER 1,536,879

RUBBER SANDAL ASSEMBLING MACHINE

Filed Aug. 29, 1924    8 Sheets-Sheet 7

Thomas Carter
INVENTOR

BY Victor J. Evans
ATTORNEY

WITNESS:

Patented May 5, 1925.

1,536,879

UNITED STATES PATENT OFFICE.

THOMAS CARTER, OF DETROIT, MICHIGAN.

RUBBER-SANDAL-ASSEMBLING MACHINE.

Application filed August 29, 1924. Serial No. 735,003.

*To all whom it may concern:*

Be it known that I, THOMAS CARTER, a citizen of the United States, residing at Detroit, in the county of Wayne and State of Michigan, have invented new and useful Improvements in Rubber-Sandal-Assembling Machines, of which the following is a specification.

The object of this invention is to produce a machine for assembling and connecting together the parts of a rubber overshoe, known to the trade as a rubber sandal.

A further object is to produce a machine for this purpose which, through a rapid cycle of operations will assemble the parts of and thereby construct a rubber sandal in a manner to increase the production and to reduce overhead expenses.

A still further object is the construction of a machine for this purpose which shall be comparatively simple in construction and therefore cheaply manufactured and which will perform its functions with ease and with accuracy.

To the attainment of the foregoing, the invention consists in the improvement as hereinafter described and definitely claimed.

In the drawings which accompany and form part of this application:—

As disclosed by the drawings I make use of a substantially rectangular frame, broadly indicated by the numeral 1. Journaled in suitable bearings longitudinally in the frame, and adjacent to the base 2 thereof there is a shaft 3. On the outer end of the shaft 3 there is freely journaled a drive pulley 4 around which is trained a belt connected to some suitable source of power (not shown). The hub of the pulley has on its inner face a clutch surface 5 engageable with a clutch element 6 having a spline movable in a splineway in the shaft 3. The slidable clutch member 6 has a continuous groove in which is received the forked end of a lever 7. The lever is pivotally supported on the base 2, as indicated by the numeral 8 and has attached thereto an outwardly extending element 9 designed to be grasped by the operator for swinging the lever to cause the clutch 6 to engage with the clutch 5 and thereby rotate the shaft 3.

Figure 4:
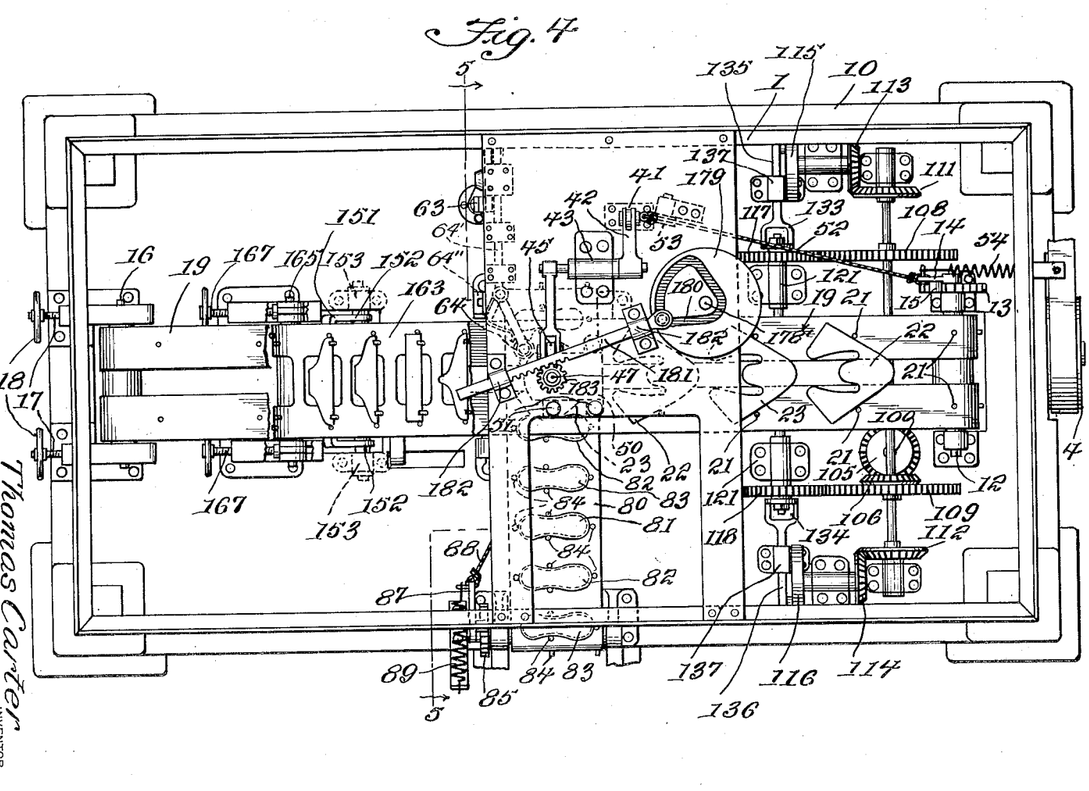
Figure 4 is a top plan view of the improvement.

The frame 1, at a suitable distance above its base is provided with a horizontal platform 10 from which there are depending brackets in which are journaled the shafts of sprocket wheels 11. Secured on the platform 10, near the end of the frame provided with the drive pulley 4 there are upstanding standards in which are journaled the shafts for other sprocket wheels. On one of these shafts indicated for distinction by the numeral 12 there is fixed a ratchet wheel 13, and on the said shaft there is loosely arranged a lever 14 that carries a spring influenced dog 15 to engage the teeth of the ratchet wheel. On the opposite end of the frame there is journaled in movable bearings 16 a shaft for other sprocket wheels. The bearings 16 have swivelly connected thereto the ends of screws which engage threaded openings in the supports for the said bearings, and the outer ends of these screws 17 are provided with handles 18. Around all of the mentioned sprocket wheels there are trained chains, and these chains support thereon an endless belt 19. The belt comprises two spaced sections between which is the movable vamp elevating element 48, which I will refer to as the last, and which will hereinafter be described in detail. The sections of the endless belt or conveyor have upstanding projections 21 thereon which are designed to sustain on the said conveyor the vamps 22 for the sandals as well as the linings 23 for the said vamps. By reference to Figure 4 of the drawings it will be noted that the vamps and linings are alternately arranged on the conveyor.

The shaft 3 has keyed thereon a beveled gear 24. This gear is in mesh with a similar gear 25 on a shaft 26 journaled in suitable bearings on the base 2. On the shaft 26 there is loosely journaled a wheel 27, and on the inner face of the hub of the wheel there is a clutch surface 28. Suitable means is provided for holding the wheel 27 from longitudinal movement on the shaft 26. Having a spline arranged in a splineway on the shaft 26 there is a clutch member 29 designed to engage the clutch surface of the wheel 27. The slidable clutch 29 is round in cross section and is provided with two grooves, one adjacent its outer end and indicated by the numeral 30, and the other adjacent to its inner end and indicated by the numeral 31. The clutch 29 has an angle passage 32 which establishes a communication between the grooves 30 and 31. The slidable clutch is influenced to clutching position by a spring 33, but is normally held out of such position by a rod or dog 34 that is received in the groove 30. The rod is prevented passing from the groove 30 into the groove 31 by a hinged plate 35 in the partition between the grooves. The rod 34 is arranged in a suitable bearing bracket 36 on the base 2 and is influenced toward the clutch by a spring 37. The rod has arranged thereon a lug or enlargement 38 in the path of contact with a push rod 39 movable through suitable bearings on the base 2.

The wheel 27 is provided on one of its faces with an elongated elliptical groove 40, and in this groove there is received a roller on the end of a rod 41 that has its outer or upper end connected to a lever 42 which is pivoted on a suitable support 43 at the top of the frame. The lever has an elongated slot adjacent to the outer end thereof that receives therethrough a pin or roller 44 formed on a lug 45 on a sleeve 46 that is connected to a rod 47 that carries on its lower end the last 48.

The lower end of the rod 47 is enlarged and is provided on one of its ends with a projecting toe portion whereby lasts of different sizes may be arranged thereon. Also there is preferably a link connection between the rod 41 and the lever 42. The last carrying rod is round in cross section and is therefore revoluble in the bore of the sleeve 46, a suitable enlargement or collar 49 is secured on the rod and rests on the top of the collar.

Figures 5, 6, 7, 8, 9:
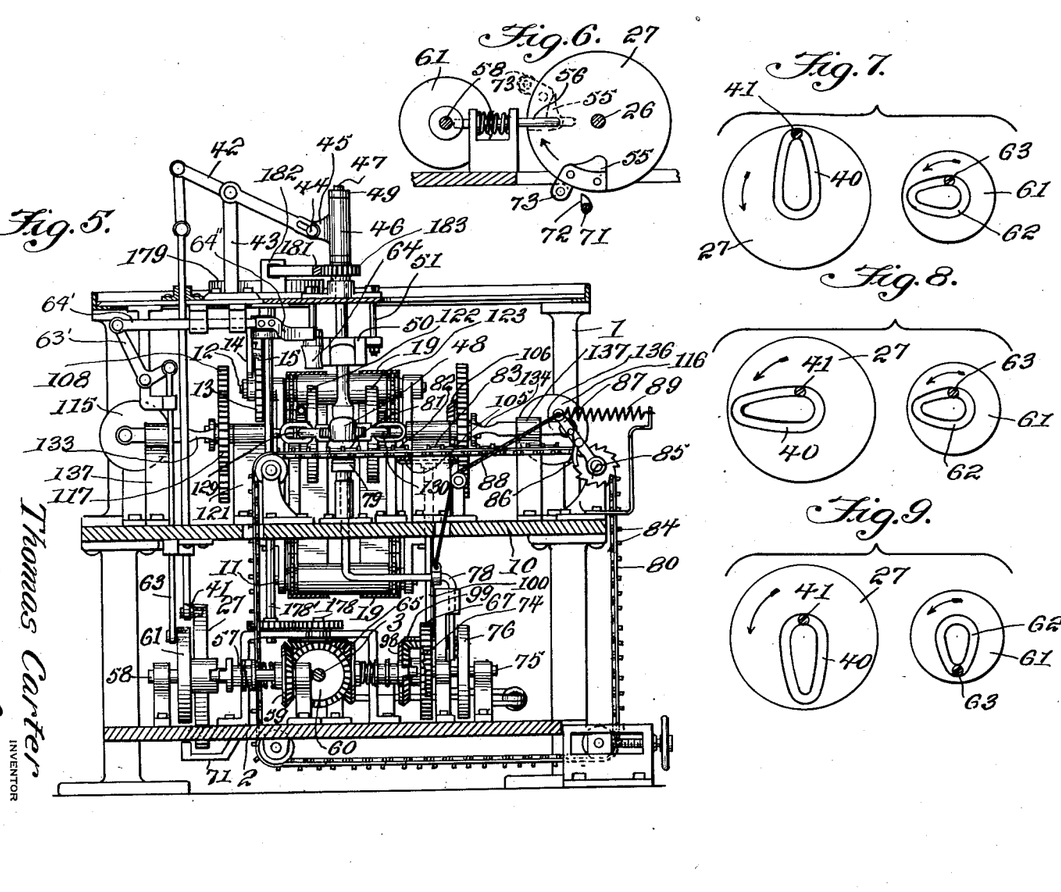
Figure 5 is a sectional view on the line 5—5 of Figure 4.
Figure 6 is a fragmentary elevation to illustrate the manner in which the last lifting cam puts into action the cam that operates the rollers for sealing the heel portion of the vamp of the sandal.
Figures 7, 8 and 9 are diagrammatic views to illustrate the various relative positions of the last lifting cam and the roller actuating cam.

The lever 7 is swung to bring the movable clutch 6 to engage with the clutch surface 5 on the pulley 4 which causes the turning of the shaft 26. The push rod 39 is pushed inwardly to move the rod or dog 34 out of the groove 30 of the slidable clutch wheel 29, permitting the spring 33 to move the clutch to engage the clutch surface 28 on the wheel 29. The roller in the elliptical cam slot 40 on the rod 41 is initially in the position illustrated in Figure 7 of the drawings. The cam wheel 26 turns one-fourth of a revolution to the position illustrated in Figure 8 of the drawings so that the rod 41 is pulled downwardly to swing the lever 42 upwardly and to raise the last carrying rod 47 to cause the last, in its passage through the slot in the conveyor, to receive thereon one of the vamp linings and to move the same into a die 50 which is supported from the top of the frame by means 51. The movement of the last is temporarily halted as the roller on the rod 41 is received in the rounded end portion of the groove 40 nearest the center of the cam wheel 26. The die 50 has its inner surface shaped to correspond with the sandal, and the rear of the said die is open.

Connected to the lever 14 there is a flexible element 52 trained under a roller 53 supported from the top of the frame, and directed upwardly therefrom and connected to the lever 42. The swinging of the lever to the position just described slackens the flexible element or cable 52 and permits the compression of a spring 54, which is connected between the element 52 and one end of the frame, to swing the lever 14 to cause the dog 15 to ratchet over the ratchet wheel 13.

On the cam wheel 27 there is a lug 55. This lug is in the path of engagement with the offset end of a spring influenced dog or rod 56 that is normally received in one of the grooves 57 of a clutch wheel similar to the clutch wheel 28. The second groove of this clutch wheel is indicated by the numeral 57' and the angle passages between the grooves are closed by a gate similar to that described in connection with the clutch wheel 28. The clutch wheel is mounted on a shaft 58 which has a splineway for the reception of a spline on the clutch. The shaft is journaled in suitable bearings on the base of the frame 1 and has keyed thereon a beveled gear 59 which is in mesh with a gear 60 keyed on the drive shaft 3. The clutch memmer is influenced by a spring to engage a clutch surface on the hub of a wheel 61 that is freely mounted on the shaft 58. The wheel 61 is of a smaller size than the cam wheel 27. The wheel 61 has on one of its faces a substantially elliptical groove 62. In this groove there is received a roller on the end of a rod 63, the said rod being movable through suitable bearings and is pivoted to one arm of a bell crank lever 63'. The second arm of the bell crank lever has pivoted thereto a suitably guided arm 64'. The arm 64' is constructed of two pivotally associated sections, the outer section has journaled thereon a concaved roller 64. The roller carrying section of the arm 64' is influenced by a spring 64''. This roller 64 is designed to be moved against the lapping ends of the vamp liner when the same is held in the die. It is to be understood that the outer or projecting portion of the lapping end of the vamp liner is provided with an adhesive substance, and because of the formation of the groove 62 in the wheel 61. The movement of the rod 63 in one direction will swing the bell crank lever 63' to impart a longitudinal movement to the roller carrying arm to cause the roller 64 to be brought entirely over the heel end of the die and the lining therein for sealing the open end of the lining. One-half revolution of the cam wheel 61 brings the roller across the heel of the lining in the die and back again. The cam wheel 27 now turns to move the rod 41 upwardly and the last downwardly to initial position. The swinging of the lever 42 by the downward movement of the last draws on the cable 52 to swing the lever 14 to cause the dog 15 to turn the ratchet wheel 13 and move the last and vamp carrying conveyor 19 one step, the final turning of the cam wheel 61 brings the dog 56 into the cam passage between the grooves 57 and 57' of the slidable clutch member on the shaft 58, opening the gate between said grooves to bring the dog or rod into the groove 51 which brings the clutch out of clutching engagement with the wheel 61. It is, of course, to be understood that the complete turning of the cam wheel 27 causes the rod or dog 34 to move through the cam passage 33 from the groove 31 into the groove 30 of the clutch wheel 28 so that the shafts 26 and 58 while still turning do not influence the cam wheels 27 or 61.

Figure 1:
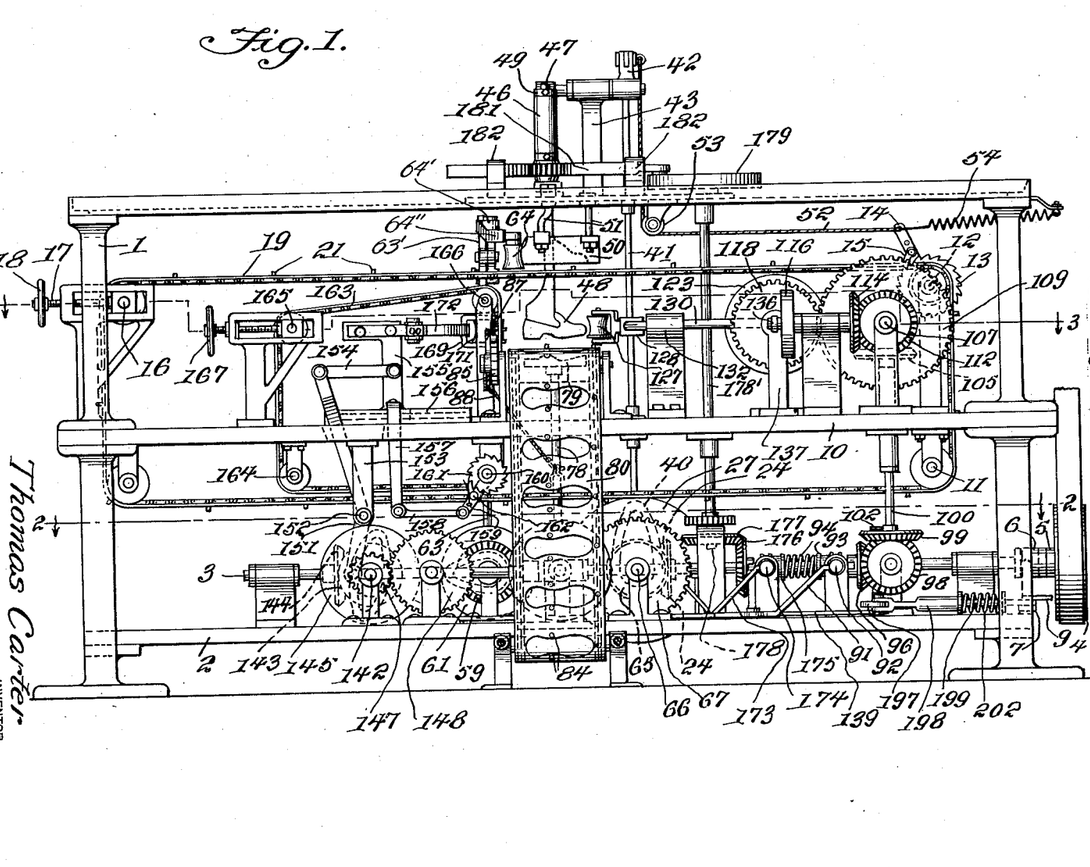
Figure 1 is a side elevation of the improvement.
Figures 2, 10, 11, 13, 14:
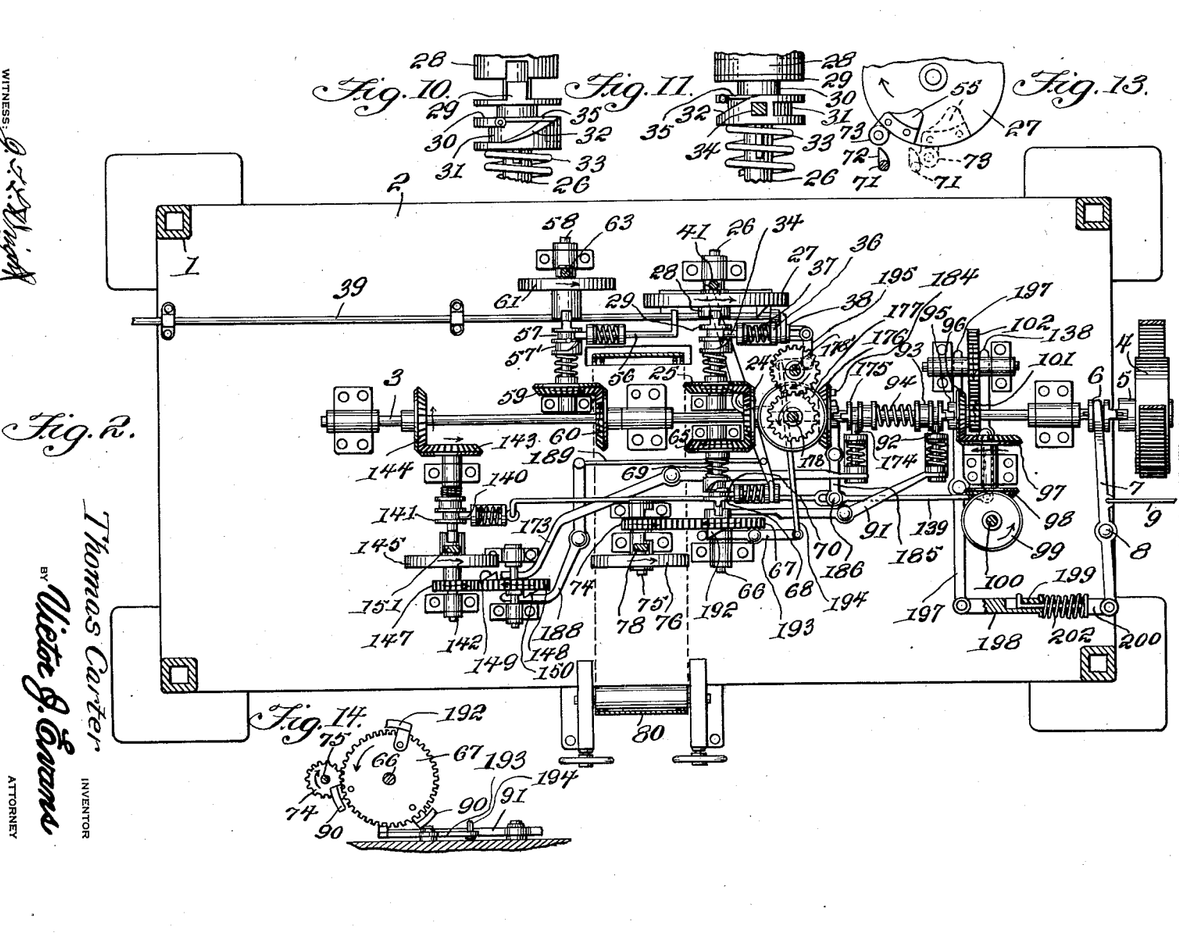
Figure 2 is a sectional view on the line 2—2 of Figure 1.
Figures 10 and 11 are fragmentary elevations looking toward the opposite sides of one of the clutches.
Figure 13 is a fragmentary elevation to illustrate the manner in which the last elevating cam wheel puts into operation the means for elevating the sole plunger.
Figure 14 is a face view of the gear wheel which operates the sole plunger mechanism.
Figure 3:
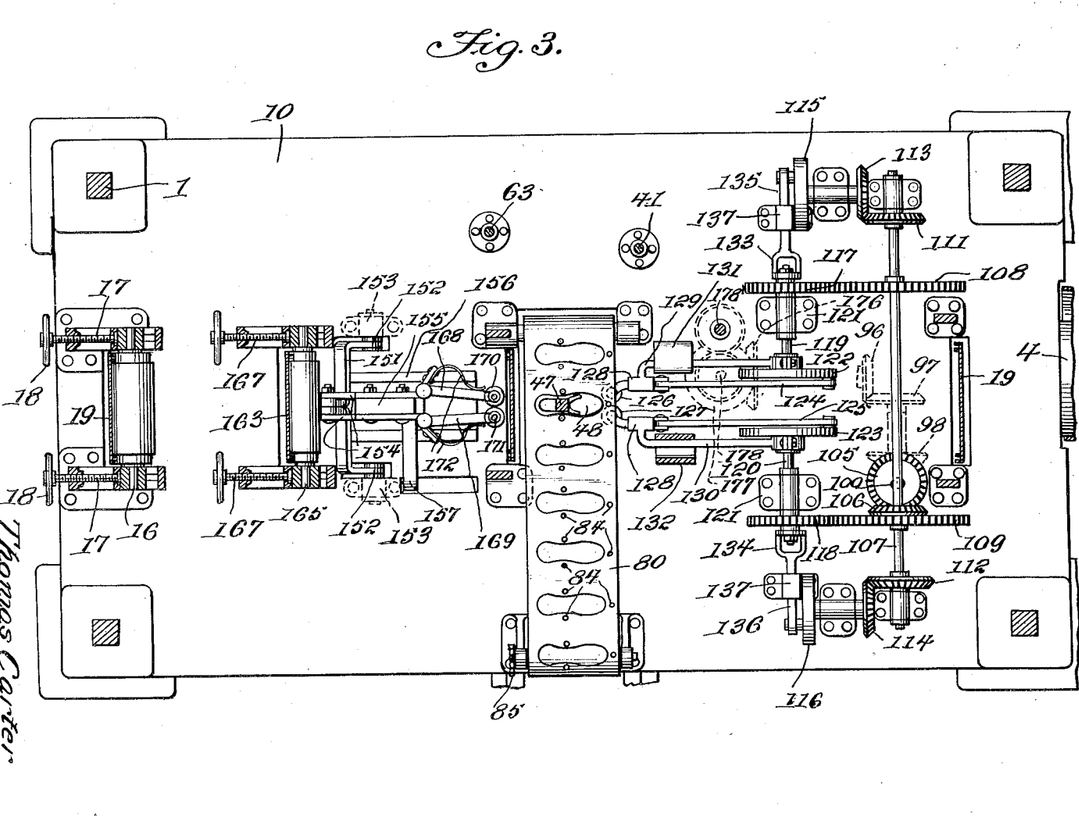
Figure 3 is a sectional view on the line 3—3 of Figure 1.
Figures 12, 15, 16, 17, 18, 19, 20, 21, 22, 23, 24, 25:
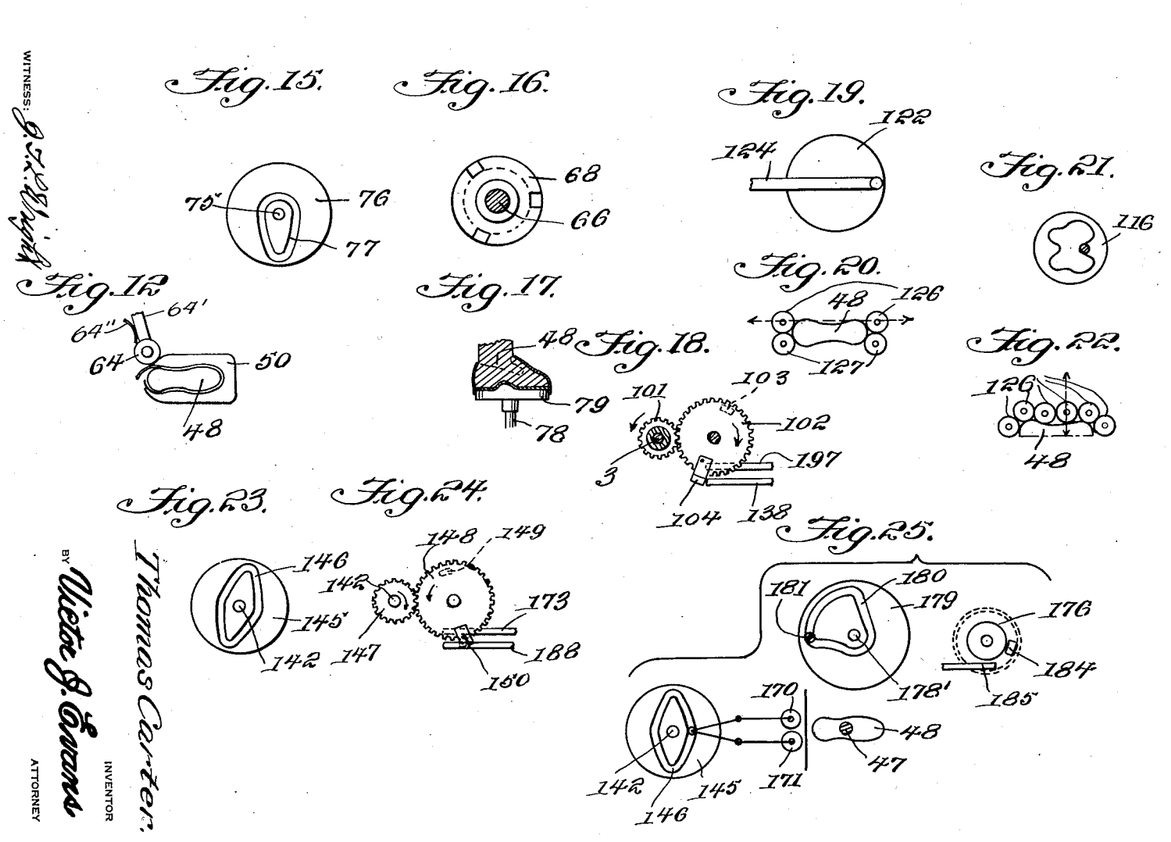
Figure 12 is a fragmentary view to show the manner in which the roller closes the seam at the heel of the vamp.
Figure 15 is a face view of the cam wheel which operates the sole plunger.
Figure 16 is a face view of the clutch associated with the sole plunger operating mechanism.
Figure 17 is a view of the sole plunger showing the same applying the inner sole of the sandal.
Figure 18 is a diagrammatic view of the gears which operate the roller actuating clutch for the toe and heel pieces as well as for operating the clutch to stop the drive shaft.
Figure 19 is a face view of one of the wheels to which the roller carrying rods is eccentrically pivoted.
Figure 20 is a diagrammatic view to show the movement of the rollers to each end of the sandal.
Figure 21 is a view of the cam wheel which effects the lateral movement of the rollers in their travel over the sides at the sole portion of the sandal.
Figure 22 is a diagrammatic view to illustrate the various positions of the rollers in their travel over the sandal.
Figure 23 is a face view of the cam wheel that effects the operation of the heel and toe rollers.
Figure 24 is a view of the gears which operate the means for turning the last and the means for raising the sole plunger.
Figures 25, 26, 27, 28 and 29 are diagrammatic views to illustrate the various positions of the roller operating cam, rollers, the last operating cam, the last and the means for tripping the roller cam clutch.
Figure 26:
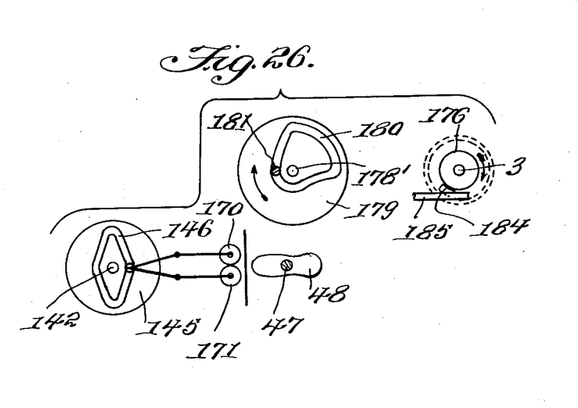
Figure 27:
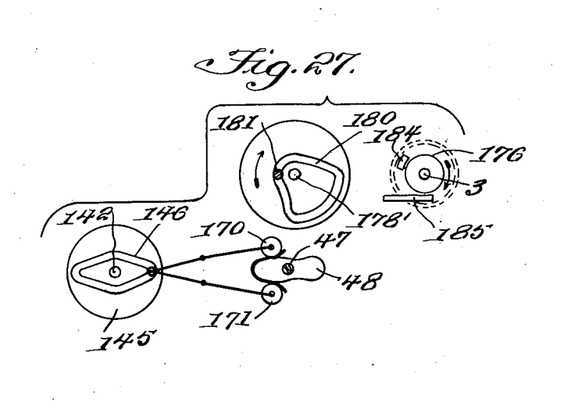
Figure 28:
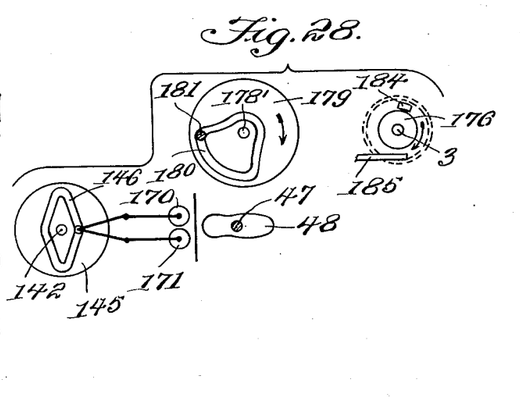
Figure 29:
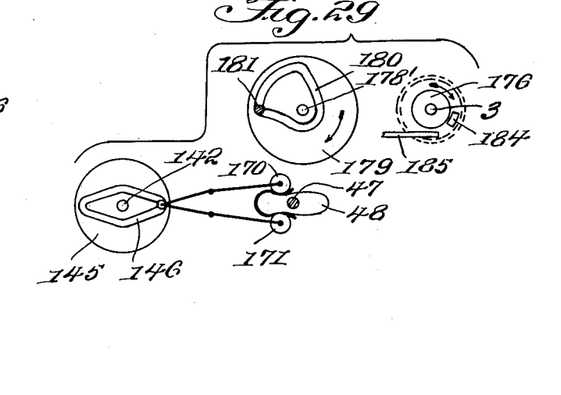
Figures 30, 31, 32, 33, 34, 35:
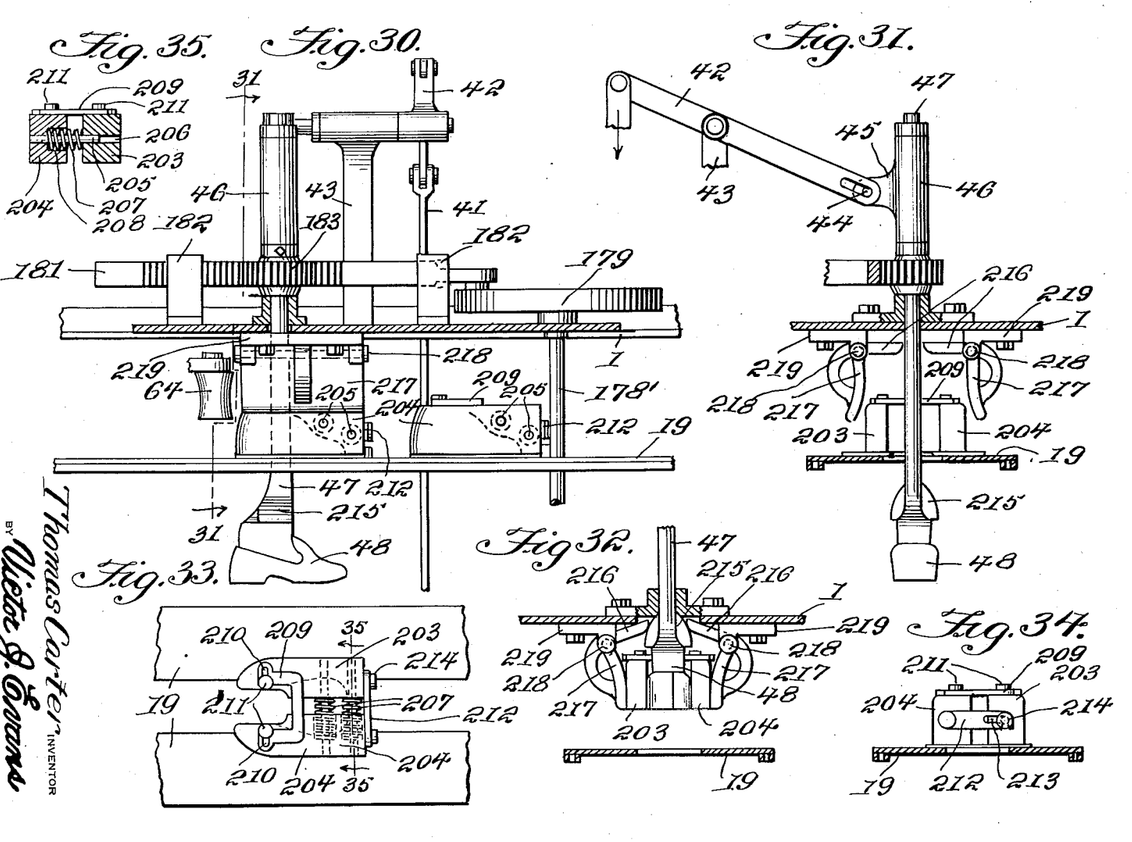
Figure 30 is an elevation, with parts in section to illustrate a modification in which a sectional die is employed.
Figure 31 is a sectional view on the line 31—31 of Figure 30.
Figure 32 is a view showing the last received in the die, both being in elevated position.
Figure 33 is a plan view of the die.
Figure 34 is an end view of the die.
Figure 35 is a sectional view on the line 35—35 of Figure 33.

In mesh with the gear 24 on the drive shaft 3 there is a gear 65 secured on a shaft 66 journaled in bearings on the base of the frame opposite and in a line with the shaft 26. Freely mounted but held from longitudinal movement on the shaft 66 there is a gear wheel 67 having a clutch face engageable by a clutch member 68 having a spline movable in a splineway on the said shaft 66. The clutch member 68 is influenced to clutching engagement with the gear 67 by a spring 69. The clutch member 68 is of a similar construction to the slidable clutch members heretofore described, the same having two spaced grooves, but is provided with three cam-shaped passages therebetween, and the outer groove is normally engaged by a spring pressed dog or rod 70, similar to the dogs or rods previously described. The dog when in the outer groove of the clutch member holds the same from clutching engagement with the gear 67. Loosely connected to the outer end of the dog 70 there is a link or lever 71 having an upstanding end formed with an angle or cam head 72 that is disposed in the path of contact with a roller 73 journaled in an element which projects beyond the periphery of the cam wheel 27. Just prior to its final movement the cam wheel 27 brings its roller 73 against the cam head 72, as disclosed by the full lines in Figure 13 of the drawings and at its final turning the said wheel 27 swings the link or lever 71 to retract the dog 70 to permit of the clutch 68 engaging the clutch surface on the gear 67, The gear 67 is in mesh with a pinion 74 fixed on a shaft 75 journaled in suitable bearings. On this shaft there is keyed a wheel 76 which has on one of its faces an elliptical groove 77 (see Figure 15). In the groove 77 there is received a roller journaled on the angle lower end of a rod 78. The rod 78 is disposed for vertical movement through suitable bearings in the frame and carries on its upper end a platen plate 79. The plate 79 has its upper surface shaped to conform to the sole and heel portion of the sandal and likewise to that of the last. The platen or what may be termed the sole plunger 79 is designed to arrange on the lining formed on the last, the inner, middle and outer soles of the sandal.

Arranged transversely on the frame with respect to the vamp and vamp lining conveyor 19 there is another endless conveyor broadly indicated by the numeral 80. The conveyor 80 includes endless chains which are trained around sprocket wheels which have their shafts journaled in suitable bearings, the bearings for the shafts at one end of the conveyor being adjustable, to compensate for any slackness in the conveyor and the conveyor is made up of spaced sections or may have spaced openings therethrough for the passage of the platen or sole plunger. Arranged over the openings in the conveyor there is an inner sole 81, next to which is arranged a middle sole 82 and next to the middle sole there is an outer sole 83. The soles are thus arranged throughout the length of the conveyor 80 and the said soles are held in proper position on the conveyor by contacting engagement of upstanding pins 84 therewith. On one of the shafts for the sprocket wheels of the endless conveyor there is fixed a ratchet wheel 85 engaged by a spring influenced dog 86 pivoted on a lever 87 that is loosely journaled on the said shaft. Between the lever 87 and the movable platen or sole plunger there is connected a flexible element 88, and to the outer end of the said element and to a supporting bracket on one side of the frame there is connected a spring 89. The upward movement of the sole plunger slackens the flexible element or cable 88, permitting the spring 89 to swing the dog carrying lever to cause the said dog to ratchet over the ratchet wheel 85, while a downward movement of the plunger draws on the element 88 to swing the rod to cause the dog to engage the ratchet and move the conveyor 80 a step in one direction.

When the gear 67 has been turned one-third of a revolution the pinion 74 will be turned a complete revolution. This turns the grooved cam wheel 76 one revolution, causing an up and down movement of the sole plunger so that the inner sole 81 is applied to the bottom of the last and adhesively connected to the edges thereof and so sustained during the downward movement of the sole plunger.

The gear 67 carries a cam-shaped trip 90 engageable on the end of a rocker arm or pivoted lever 91. The pivoted lever 91 has one of its ends loosely associated with a spring influenced dog 92 engageable in one of the grooves of a slidable clutch 93 similar to the slidable clutches above described. Between the grooves of the clutch 93 there is a passage whose walls are angular and this passage is closed by a pivoted gate as previously set forth. The swinging of the lever 91 releases the dog 92, permitting the same by the influence of a spring 94 to slide in a keyway on the shaft 3 to engage a clutch element 95 on a gear 96. The gear 96 is in mesh with a similar gear 97. The shaft of the gear 97 is journaled in a suitable bearing and carries a gear 98 in mesh with a similar gear 99 on an upright shaft 100. The gear 96 is loose on the shaft 3 and carries a pinion 101. The pinion is in mesh with a gear 102. The gear 102 has its shaft journaled in suitable bearings and carries oppositely arranged cam elements 103 and 104 (see Figure 18), the purpose of which will presently be described.

The shaft 100 operates a gear 105 in mesh with a beveled gear 106 on a transversely arranged shaft 107. On the shaft 107 there are keyed toothed wheels 108 and 109 respectively. Also on the ends of the shaft 107 there are keyed gears 111 and 112 respectively. The gears 111 and 112 are in mesh with similar gears 113 and 114 respectively. These gears have their shafts suitably journaled and carry on their outer ends wheels 115 and 116 respectively. The wheels 108 and 109 are in mesh with gears 117 and 118 respectively on shafts 119 and 120 respectively. The shafts 119 and 120 are slidably mounted in bearings 121 respectively. On their inner or confronting ends the shafts 119 and 120 carry wheels 122 and 123 respectively. To the inner faces of the wheels 122 and 123 there are eccentrically pivoted rods 124 and 125 respectively. The rods 124 and 125 have their outer ends inwardly directed and are widened and bifurcated for the reception of pivoted rollers 126 and 127 respectively. The rods 124 and 125 pass through sleeves 128 respectively on the angle ends of rods 129 and 130. These rods are loosely received through widened slots in bearings 131 and 132. The rods 129 and 130 have split bearings which are arranged around the shafts 119 and 120, the said shafts being provided with suitable enlargements to prevent lateral movement of the bearings. Swivelly connected by means 133 and 134 to the outer ends of the shafts 119 and 120 there are rods 135 and 136 slidable through bearings 137 respectively. These rods have their ends eccentrically pivoted to the wheels 115 and 116 respectively. The operation of the shaft 107 will cause the simultaneous movement of the shafts 119 and 120, and the shafts for the wheels 115 and 116. The turning of the shafts 119 and 120 will move the roller carrying rods 124 and 125 longitudinally over the last on which the inner lining and the inner sole is received, the turning of the wheels 115 and 116 imparting a lateral movement to the shafts 119 and 120 so that the rollers 126 and 127 will contact the entire side at the sole portion of the inner lining and inner sole, and thus adhesively connect these parts, it being understood that the said parts are treated with an adhesive.

One revolution of the gear 101 drives the gear 102 one-half of a revolution. A complete revolution of the gear 101 will cause the dog 92 to throw the clutch 93 out of engagement with the clutch surface on the gear 96. The one-half revolution made by the gear 102 will bring its cam trip 104 against a rocker arm or pivoted lever 138 to cause the same to draw on a rod 139, which is pivotally associated therewith, to bring a spring influenced dog 140 out of one of the grooves of a slidable clutch 141, of a construction as previously described. This clutch is spring influenced and is mounted for slidable movement on a shaft 142 having on one of its ends a gear 143 in mesh with a similar gear 144 keyed on the drive shaft 3. The clutch is engageable with a clutch surface on a wheel 145. The wheel 145 has on one of its faces a substantially diamond-shaped groove 146 (see Figure 23). On the shaft 142 there is keyed a gear 147 which is in mesh with a larger gear 148 (see Figure 24). The wheel 148 carries two oppositely arranged trip cams 149 and 150 respectively, the purpose of which will presently be apparent.

In the diamond-shaped groove 146 of the wheel 145 there is received a roller on one end of an angle rod or lever 151. The lever is pivotally supported, as at 152 to a bracket 153 depending from the platform 10. The upper end of the lever has a link connection 154 with a traveler 155. The traveler has its base portion received in a suitable guide 156 on the platform 10. From the base of the traveler 155 there depends an arm 157 connected by a link 158 to a lever 159. The lever 159 is loosely mounted on a shaft 160. On this shaft there is keyed a ratchet wheel 161. The lever carries a spring pressed dog 162 to engage the ratchet wheel. The shaft 160 carries toothed wheels or rollers for a sectional endless conveyor 163. The conveyor is trained around rollers on other shafts 164, 165 and 166 respectively. The shaft 165 is journaled in adjustable bearings, screw means 167 similar to that previously described being provided for adjusting the bearings and consequently the tension of the endless conveyor 163. The conveyor carries thereon inner and outer heel reinforcements, toe pieces and heel binders for the sandal.

The traveler 155 has an elongated head portion to one end of which there are pivoted arms 168 and 169 which carry at their outer ends rollers 170 and 171. The rods or arms 168 and 169 are influenced by springs 172 respectively to bring the rollers thereof against each other.

It will be obvious that the turning of the wheel 145 will impart a rocking movement to the lever 151 and likewise the traveler 155. The reciprocatory movement of the traveler will impart a timed movement to the endless conveyor 163. When the cam wheel 145 makes one-half of a revolution the rollers on the traveler engage and adhesively connect on the sandal the heel reinforcement, and on the next one-half revolution of the wheel 145 the outer heel reinforcement will be applied. The clutch 141 is thrown out. When the cam wheel 145 completes its revolution the gear 148, which is larger than the gear 147 will be turned one-half of a revolution. This causes the cam 149 on the said wheel 148 to contact with and swing a pivoted rocker lever 173 to retract a spring influenced dog 174 from one of the grooves of a slidable clutch 175 to allow the spring 94 to slide the said clutch in a splineway on the shaft 3 to engage a clutch surface on a gear 176. The angle or cam passage between the grooves in the clutch 175 are normally closed by a swingable gate, and the gear 176 is in mesh with a gear 177 on a shaft 178. The shaft 178 carries a pinion in mesh with a similar pinion on a shaft 178' that carries on its upper end a wheel 179. This wheel is provided with a cam groove 180. In the groove there is received a roller on one end of a rack bar 181. The rack bar is movable through suitable bearings 182 and is in mesh with a pinion 183 on the revoluble as well as reciprocatory last carrying rod 47. One-fourth of a revolution of the grooved cam wheel 179 will turn the last carrying rod to bring the toe of the sandal to face the rollers 170 and 171. One-fourth of a revolution of the gear 176 brings a cam trip element 184 thereon into contacting engagement with a pivotally supported rocker arm or lever 185. The rocker arm or lever carries a roller 186 that is received in the slotted enlargement in the rod 139 moving the said rod to release the dog 140 from the clutch 141, permitting the same to again engage the cam surface on the wheel 145, to revolve the said wheel to impart a rocking movement to the lever 151 and a reciprocatory longitudinal movement to the traveler 155. The endless conveyor 163 has been moved a step to bring the rollers to engage the toe piece for the sandal to apply the same thereon, the shape of the groove 180 in the wheel 179 holding the said wheel stationary during the application of the toe piece. The wheel 145 makes one-fourth of a revolution in applying the toe piece.

On the next one-fourth of a revolution of the wheel 179 the rack bar will be moved to turn the last carrying rod to initial position and during this turning of the wheel 179 the wheel 145 makes a further one-fourth revolution. The complete turning of the wheel 179 causes the dog 174 to throw the clutch 175 to inoperative position. The next one-fourth revolution of the wheel 145 again brings the rollers forward and applies the binder. Thus during one revolution of the wheel 179 the wheel 145 has made three-fourths of a revolution. On the last fourth of its revolution the wheel 145 operates to move the traveler to bring the rollers 170 and 171 away from the sandal and the dog 140 passes through the cam slot in the clutch 141 to move the same out of engagement with the clutch surface on the wheel 145. The wheel 145, during the total operation has made two revolutions, and through the revolving of the gears 147 and 148 with the said wheel the cam trip 150 on the wheel 148 will swing a pivotally supported rocker arm 188 to move a rod 189 pivoted thereto to swing the pivotally supported rocker arm 71 to release the dog 70 of the sole plunger operating mechanism to elevate the plunger together with a sole which it has removed from the conveyor 80 to deposit the same in the sandal and against the last. During this operation the gear 67 makes one-third of a revolution while the wheel 76 makes a complete revolution to bring the sole plunger up and back to initial position after placing the middle sole on the last, while the gear 67 makes two-thirds of a revolution during two revolutions of the wheel 76. A cam trip 192 on the gear 67 now contacts with and swings a pivoted lever 193. The lever is connected by a rod 194 to a bell crank lever 195. The movement of the rod will, of course, swing the bell crank lever. The bell crank lever is loosely connected to the dog 34 for the clutch 28, and releases the clutch to allow the same to engage with the wheel 27. The wheel 27 causes the last carrying rod to bring the vamp into the die, releasing the dog 56 and likewise the clutch which engages the clutch surface on the wheel 61 to permit the roller 64 sealing the heel portion of the sandal. The conveyor 19 is operated one step. A complete turning of the wheel 27 brings the roller 73 to engage the cam 72 on the rocker lever 71 to again release the cam for clutching engagement with the gear 67 to put into operation the sole plunger for applying the sole of the sandal. One-third revolution of the gear 67 causes the wheel 76 to move the sole plunger to apply the outer sole and to be moved away therefrom, the sole conveyor thereafter being operated one step. The gear 67 has made a complete revolution during its total operation. The gear 67, at the end of one-third of its revolution causes the dog to release the clutch 93 to allow the rollers 170 and 171 to roll the vamp and sole on the last. During this operation the gear 102 makes the second half of its revolution and brings its second cam trip against one end of a pivotally supported rocker arm or lever 197 to swing a bar 198. The bar 198 is slotted and in this slot there is received the offset end of a rod 199. This rod has an outer headed end 200 which is pivotally secured to the lever 7. Between the head 200 and the end of the bar 198 there is arranged around the rod a spring 202. The swinging of the rocker arm 197 swings the lever 7 to move the clutch 6 out of engagement with the clutch surface 5 on the pulley 4 and thus halts the operation of the shaft 3. The completed sandal is removed from the last and thereafter the machine is operated as above described. By forming the bar 198 with the slot for the reception of the rod 199 the element 9 may be moved to swing the lever 7 to apply the clutch 6 in the initial operation of the machine without influencing the rocker arm 197.

I may find it desirable to employ a sectional die, and have illustrated such construction in Figures 30 to 35. The remainder of the structure is similar to that previously described and reference characters employed in connection with the said previously described figures are applicable to those shown in said Figures 30 to 35. The sections of the die are indicated by the numerals 203 and 204 respectively, the same being held in proper spaced relation through the medium of pins 205 received in suitable slots 206. Each of the pins is surrounded by springs 207 received in sockets 208 in one of the die sections and exert a pressure against the other die section. On the top of the die sections there is arranged a plate 209 having angle arms provided with elongated slots 210. Through these slots there are passed the shanks of headed elements 211 which enter the die sections. Also on the forward end of the die section 204 there is pivoted a plate 212. This plate may be in the nature of a latch member and is provided with an elongated slot 213 that receives therethrough the shank of a headed element 214 that enters the die section 203. In this instance the die is movable by the last 48 on the rod 47, the said die normally resting on the conveyor 19. On the upward movement of the rod 47 the die with the vamp or lining is raised against the top of the frame, and when so elevated on the sides of the rod 47 above the last 48 will contact with arms 216 on clamps 217 that are pivoted, as at 218 on brackets 219 secured on the under face of the top of the frame.

It is believed that the foregoing description when taken in connection with the drawings will fully set forth the construction, operation and advantages of my improvement to those skilled in the art to which such inventions relate, and that further detailed description will not be required. It is deemed necessary to state, however, that the nature of the improvement is such as to necessarily render the same susceptible to various changes and modifications, and therefore it is to be understood that I may make such departures from the illustrated embodiment herein set forth as fairly fall within the scope of what I claim.

Having described the invention, I claim:—

1. In a rubber sandal assembling machine, of a die, means for raising the vamp of a sandal into the die to form the same into a sandal upper, means for sealing the ends of the vamp, means operating said first mentioned means for lowering the upper from the die, and means for applying and securing the sole of the sandal to the upper when in last mentioned position.

2. In a rubber sandal assembling machine, a revoluble shaft, a die, clutch controlled means operated by the shaft for raising a vamp into the die, means operated by the shaft for sealing the ends of the vamp and converting the same into an upper, means moving the vamp out of the die, and means operated by the shaft for elevating and sealing the sole of the sandal to the upper.

3. In a machine and for assembling adhesively treated parts of a rubber sandal, a revoluble shaft, a die, clutch controlled means operated by the shaft for raising the sandal vamp into the die, means operated by the shaft for sealing the ends of the vamp and converting the same into an upper, means moving the vamp out of the die, means operated by the shaft for elevating and sealing the sole of the sandal to the upper, and means for automatically halting the shaft after the sole has been applied to the upper.

4. In a rubber sandal assembling machine, a revoluble shaft, a die, clutch influenced means operable by the shaft for raising and compressing a vamp into the die, means operated by the shaft for sealing the ends of the vamp to convert the same into an upper, means for lowering the upper from the die, means operated by the shaft for placing a sole in the upper, and means also operated by the shaft for rolling and sealing the sole to the upper.

5. In a rubber sandal assembling machine, comprising a clutch controlled driven shaft, a die, clutch controlled means operable by the shaft when the clutch therefor is in release position for placing a vamp in the die, means operable by the shaft for contacting with and sealing the ends of the vamp to convert the same into an upper, means operable by the shaft for placing a sole on the upper, means also operable by the shaft for sealing the sole on the upper, and means for automatically operating the clutch of the drive shaft to stop the turning thereof when the sandal has been thus formed.

6. In a rubber sandal assembling machine, a conveyor for the sandal vamps, a die above the conveyor, means movable through the die and conveyor to lift a vamp from the conveyor and to compress the same in the die, means sealing the ends of the vamp and converting the same into an upper when the vamp is in the die, means for lowering the vamp lifting means, a conveyor for the soles of the sandal, means movable through the conveyor to engage one of the soles to raise the same against the upper, and means for rolling and sealing the edges of the upper and sole.

7. In a rubber sandal assembling machine, including a die above the vamp of the sandal, a driven shaft, clutch controlled means operable thereby when in release position for raising the vamp into the die, means for sealing the ends of the vamp when in the die for converting the vamp into an upper, means for lowering the vamp lifting means and the upper out of the die, means for placing a sole in the upper, means for rolling and sealing the sole on the upper, means for applying a heel piece on the upper, means for revolving the upper elevating means to arrange the same adjacent the last mentioned means to permit of the last mentioned means applying the toe piece to the sandal, and means for returning the vamp supporting means to initial position and for halting further operation of any of the mentioned means.

8. In a rubber sandal assembling machine, conveyors for the adhesively treated parts of a sandal, means separably engaging the parts to associate the same to assemble the sandal, means for operating the conveyors step by step to bring the parts carried thereby to position to be operated on by the assembling means, and means between the conveyor operating means and the first mentioned means for permitting such movement of the conveyors after the said assembling means has acted on and sealed the parts of the sandal.

9. In a sandal assembling machine, sectional conveyors upon which the parts from which a rubber sandal is constructed are arranged, a pawl and ratchet associated with each of the conveyors, a drive shaft, reciprocatory means actuated thereby in timed relation with respect to each other for engaging the separate pieces from the conveyors and for forming the same into a rubber sandal, means actuated by the reciprocatory means for imparting a step by step movement to the conveyors to arrange the parts thereof in the path of operable engagement with said reciprocatory means, and means for automatically stopping the drive shaft when the sandal is completed.

10. In a rubber sandal assembling machine, endless sectional conveyors upon which adhesively treated parts or pieces constituting the sandal are arranged in spaced relation to each other, a drive shaft, reciprocatory means operated by the drive shaft, clutch means between the reciprocatory and drive shaft, one of which being hand operated and the others automatically operated to permit of the actuation of the reciprocatory means by the drive shaft, means associated with the reciprocatory means for taking separate parts or pieces of a sandal from the conveyors to form the same into a sandal, means between the reciprocatory means and pawl and ratchet parts of the conveyors for permitting a step by step timed movement of the conveyors to arrange the parts or pieces carried thereon for operable engagement with the reciprocatory means, and means for stopping the drive shaft when the sandal is completed.

11. In a rubber sandal assembling machine, endless conveyors comprising each a separable member upon which adhesively treated parts or sections of a sandal are arranged in proper spaced relation, a last, a die thereabove, a drive shaft, clutch operated means actuated by the drive shaft to raise the last to bring parts of the sandal into the die at proper spaced intervals, means sealing said parts when in the die, means lowering the last and the sandal part thereon from the die, sandal sole applying means, automatically operated clutch means permitting the drive shaft to actuate the sole applying means, and clutch controlled roller carrying means movable to bring the rollers thereof to seal the sole to the upper of the sandal and to apply the toe and heel pieces to said sandal, the clutches for said means being automatically operated in spaced timed relation with respect to each other.

12. In a rubber sandal assembling machine, endless divided conveyors upon which the vamp lining and the vamp, the inner and outer heel reinforcements and heel binder, the middle sole and outer sole of the sandal are respectively arranged, a sprocket wheel associated with the roller of each of the conveyors, a spring influenced lever loose on the shaft of each sprocket wheel, a spring influenced dog on each lever engaging each sprocket wheel, a die, a movable last, a drive shaft, clutch controlled means operable by the drive shaft for first raising the last to engage with a vamp lining to place the same in the die, roller means actuated by the drive shaft for sealing the ends of the lining when in the die, means moving the last and lining out of the die, a sole plunger below the conveyor carrying the soles, means for operating the same to bring a lining or inner sole against the last, means movable through the heel and toe carrying conveyor for applying first the inner and then the outer heel reinforcement to the assembled linings, means for revolving the last to permit said heel applying means to apply the toe piece on the lining, means returning the last to initial position to permit of the heel applying means applying a heel binder on the lining, means permitting the operation of the first mentioned means for elevating the last with a vamp into the die to apply the vamp on the lining, means permitting the actuation of the second mentioned means for sealing the ends of the vamp, means returning the last elevating means to initial position, means operating the sole applying means to apply the outer sole to the sandal, means comprising rollers susceptible to longitudinal and lateral movement for rolling the sole on the vamp, means actuated by the return of the last mentioned means for stopping the drive shaft, and means actuated by the sandal forming means for influencing the levers to cause the dogs thereon to turn the sprocket wheels and conveyors one step at each operation.

13. In a rubber sandal making machine, in combination with means for forming the upper and applying the sole to the sandal, of means for sealing the sole on the sandal, comprising rollers, means for moving the rollers bodily and longitudinally over the entire surface of the sole and vamp and for holding the rollers in tight contact therewith throughout the operation thereof.

In testimony whereof I affix my signature.

THOMAS CARTER.